United States Patent [19]

Dahl

[11] Patent Number: 4,565,748
[45] Date of Patent: Jan. 21, 1986

[54] MAGNETICALLY OPERATED ELECTROLYTE CIRCULATION SYSTEM

[76] Inventor: Ernest A. Dahl, 3247 Breaker, Ventura, Calif. 93003

[21] Appl. No.: 696,968

[22] Filed: Jan. 31, 1985

[51] Int. Cl.$^4$ ............................................. H01M 2/38
[52] U.S. Cl. ........................................ 429/10; 429/51; 429/72; 429/81; 204/DIG. 5; 417/50
[58] Field of Search .................. 429/10, 14, 51, 67, 429/72, 81; 204/DIG. 5; 417/50

[56] References Cited

U.S. PATENT DOCUMENTS

| | | | |
|---|---|---|---|
| 3,005,116 | 10/1961 | Reece | 417/50 X |
| 3,083,253 | 3/1963 | Sundberg | 429/51 |
| 3,219,851 | 11/1965 | Kidwell | 417/50 X |
| 3,305,404 | 2/1967 | Sundberg | 429/59 |
| 3,525,644 | 8/1970 | Winsel et al. | 429/14 |
| 3,597,278 | 8/1971 | Von Brimer | 429/10 |
| 3,708,246 | 1/1973 | Vasilievich et al. | 417/50 |
| 4,025,699 | 5/1977 | Silva et al. | 429/72 |
| 4,035,554 | 7/1977 | Halberstadt et al. | 429/80 |
| 4,042,754 | 8/1977 | Borello | 429/10 |
| 4,469,759 | 9/1984 | Newill | 429/10 |

Primary Examiner—Anthony Skapars
Attorney, Agent, or Firm—Robert F. Beers; Joseph M. St-Amand

[57] ABSTRACT

The invention consists of an electromagnetic-field pump. Electrolyte which is an electromagnetic conductor can be stirred and pumped by forcing a field through the electrolyte to magnetically charge the electrolyte and making use of magnetic force exerted on the charged electrolyte by a magnetic field to move the electrolyte. There are no moving parts in the device, only the changing magnetic fields. The magnetic pump assembly is submerged in an electrolyte and consists of an open ended tubular nonmagnetic chamber through which the electrolyte is forced to move in response to changing magnetic fields from external coils which are positioned about the exterior of the tubular chamber and operated to sequentially change in phase.

8 Claims, 8 Drawing Figures

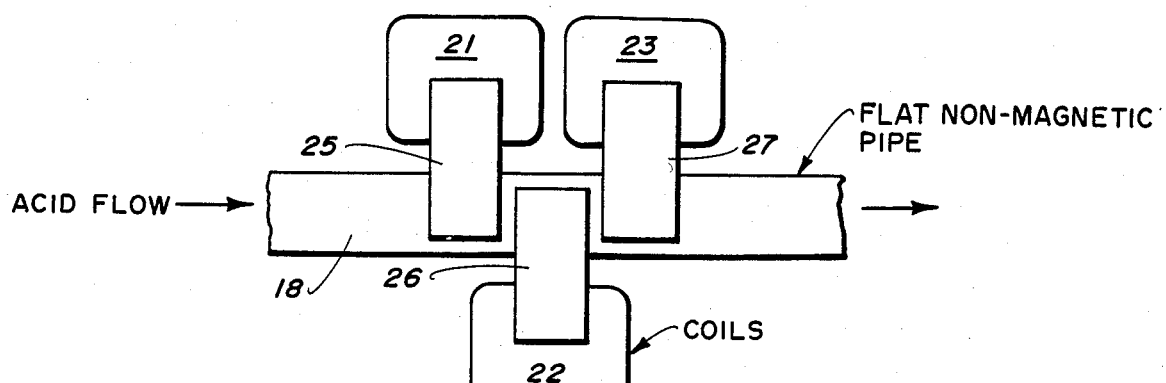
Fig. 3.
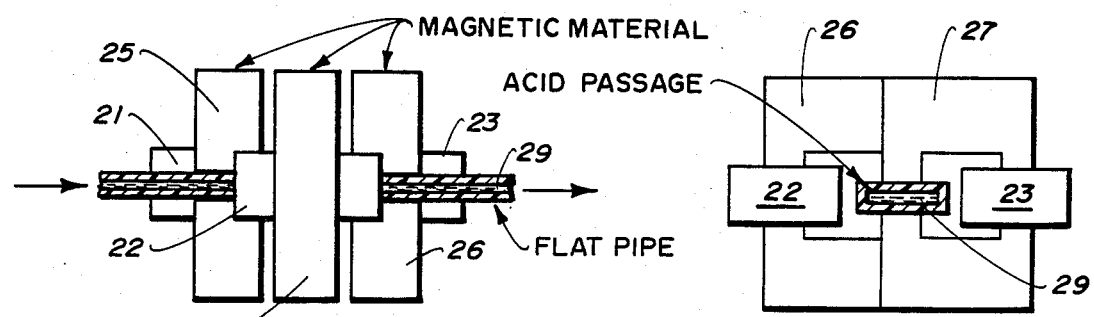
Fig. 4.    Fig. 5.
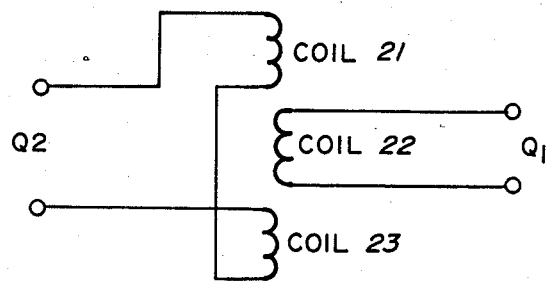
Fig. 6.
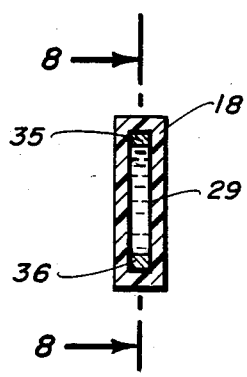    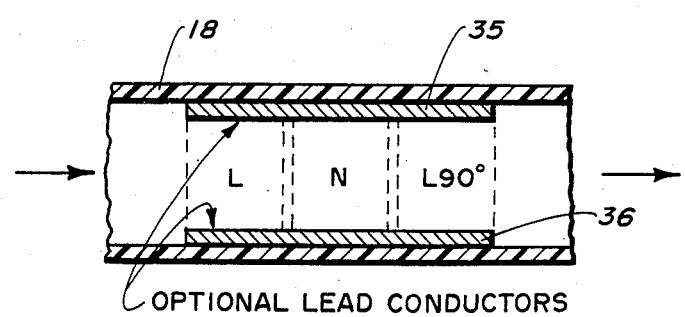
Fig. 7.    Fig. 8.

MAGNETICALLY OPERATED ELECTROLYTE CIRCULATION SYSTEM

STATEMENT OF GOVERNMENT INTEREST

The invention described herein may be manufactured and used by or for the Government of the United States of America for governmental purposes without the payment or any royalties thereon or therefor.

BACKGROUND OF THE INVENTION

The present invention relates generally to improvements in electrolyte circulation, in electrolytic batteries and more particularly to a magnetically operated electrolyte circulation pump for providing significant improvement in battery performance.

Large lead-acid batteries suffer from the problem of electrolyte sulfation and stratification. When a cell is charged, acid is formed at the plates and this more dense acid tends to sink to the bottom of the cell. In tall cells, where diffusion is insufficient to overcome the density gradient, it is necessary to provide some mechanical agitation in order to circulate the electrolyte and maintain a homogeneous electrolyte.

A common means of accomplishing electrolyte agitation is an airlift pump, such as the type used to circulate water small aquaria. This type of pump has, however, an inherent maintenance problem; the air inlet tube becomes clogged at the interface between the incoming air and the electrolyte. Evaporation of the interface causes build-up of deposits of scale inside the tip of the tube, eventually plugging it and disabling the pump. Although the tube can be readily cleared by running a rod through it, the failure may go unrecognized, since the cell will continue to operate satisfactorily until after irreversible damage is done to the electrodes.

SUMMARY OF THE INVENTION

An alternative to the airlift pump, and one which shares its advantage of having no moving parts, is the electromagnetic pump of this invention. Liquids which are electrical/magnetic conductors can be magnetically charged to a fixed state and then stirred and pumped by forcing the charged electrolyte to move by changing polarity of the magnetic field. If the force is induced magnetically, then no electrical contact need be made to the fluid and a completely sealed pump, free of moving parts, results.

The magnetic pump consists of electromagnetic coils and core material surrounding a tubular passageway which extends from the bottom to the top of each battery cell chamber. There are no moving parts. Changing magnetic fields caused by AC current in the pump coils magnetically charge the electrolyte and as the fields reverse force the electrolyte to move. The changing magnetic fields act to pump electrolyte through the tubular chamber from the bottom to the top of an electrolytic cell.

BRIEF DESCRIPTION OF THE DRAWINGS

FIGS. 3, 4 and 5 are front, side and top views, respectively, of a preferred embodiment of the invention, with FIGS. 4 and 5 showing the electrolyte flow tube in cross-section.

FIG. 6 is a circuit diagram of the magnetic coils shown in FIGS. 3-5.

FIGS. 7 and 8 are enlarged cross-sectional views of the electrolyte flow tube showing optional lead conductors which assist the magnetic fields to increase the drive on the electrolyte.

DESCRIPTION OF THE PREFERRED EMBODIMENT

Although the electrolyte capacity of typical large cells is on the order of 100 liters, a circulation rate of only 5 ml/sec (4 gallons/hour) is adequate so long as it is maintained reliably. The head requirement is also normally very small. If the distribution of acid is uniform throughout the cell, then the pump head requirement is only that required to overcome the viscous loss in an approximately one-meter length of tubing. This pressure amounts to only on the order of 100 pascals at the low flow rate required. If, however, the cell has been allowed to stratify, the circulation pump must still be capable of establishing circulation and this imposes a much larger head requirement. Assuming for the worst case that acid at the bottom of the cell has a specific gravity of 1.350, while the cell average has a specific gravity of 1.150; this results in a head of 2000 pascals.

The major difficulty in applying a magnetic pump to circulate sulphuric acid is the relatively high resistivity of the acid. Sodium, for example has a volume resistivity of only about $10^{-5}$ ohm-cm, whereas for battery acid this value is over 1 ohm-cm. Because of this, the magnetic pump will have exercisable efficiency in acid. Ignoring all losses except for heat of the fluid, a single-stage magnetic pump, operating in battery acid and developing the head described above, will consume about 500 watts. This figure depends, of course, upon the values for various design parameters, most importantly upon the thinnest dimension permissible for the acid passage and the maximum usable magnetic field. Thinner electrolyte passage sections produce more pressure per watt; a value of 0.3 mm is about the thinnest allowable to avoid contaminant clogging. The more intense the magnetic field the better, and a value of 10,000 gauss permits the use of common magnetic materials.

One can reduce the power consumed by a pump, in the head-limited case of interest, by cascading a number of stages. To a first approximation the required power varies inversely with the number of stages. For example, a 500-stage pump could develop 2000 pascals with only one watt, however, some compromise in design is needed.

Figure 1:
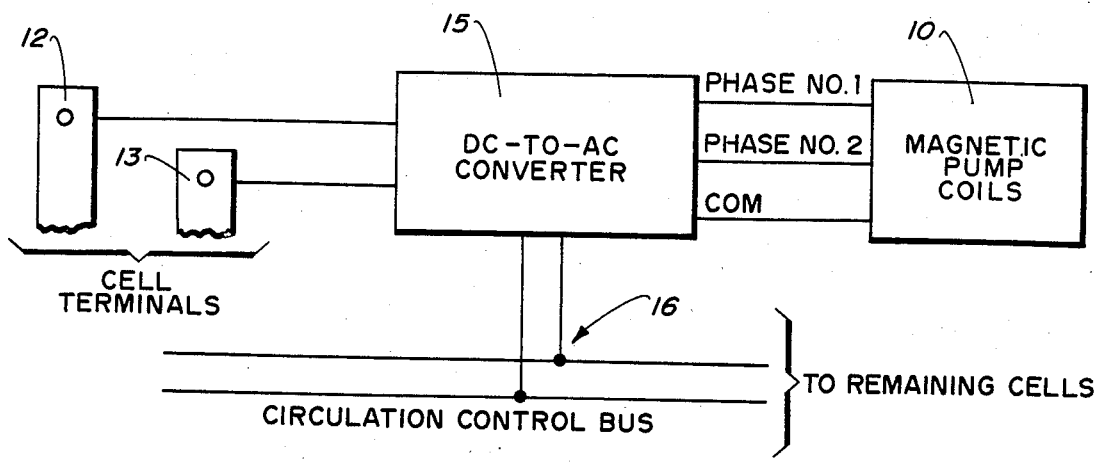
FIG. 1 is an electrical schematic diagram of the magnetic electrolyte pump system of this invention.

A typical magnetic pump system electrical schematic arrangement is shown in FIG. 1. The electromagnetic pump coils 10 draw power directly from the cell terminals 12 and 13 at about 2 volts DC. The necessary high-frequency AC for the pump coils 10 is provided by a solid-state DC-to-AC inverter 15. Two-phase AC is required by the magnetic pump, so the converter 15 has a three-wire output to the electromagnetic pump coils 10. Means is usually provided for emergency circulation shutdown and this requires that all the DC-to-AC converters be enabled by a common circulation control bus 16. Connection to the control bus may be made through suitable, e.g., optical, isolators to prevent sneak inter-cell paths.

Figure 2:
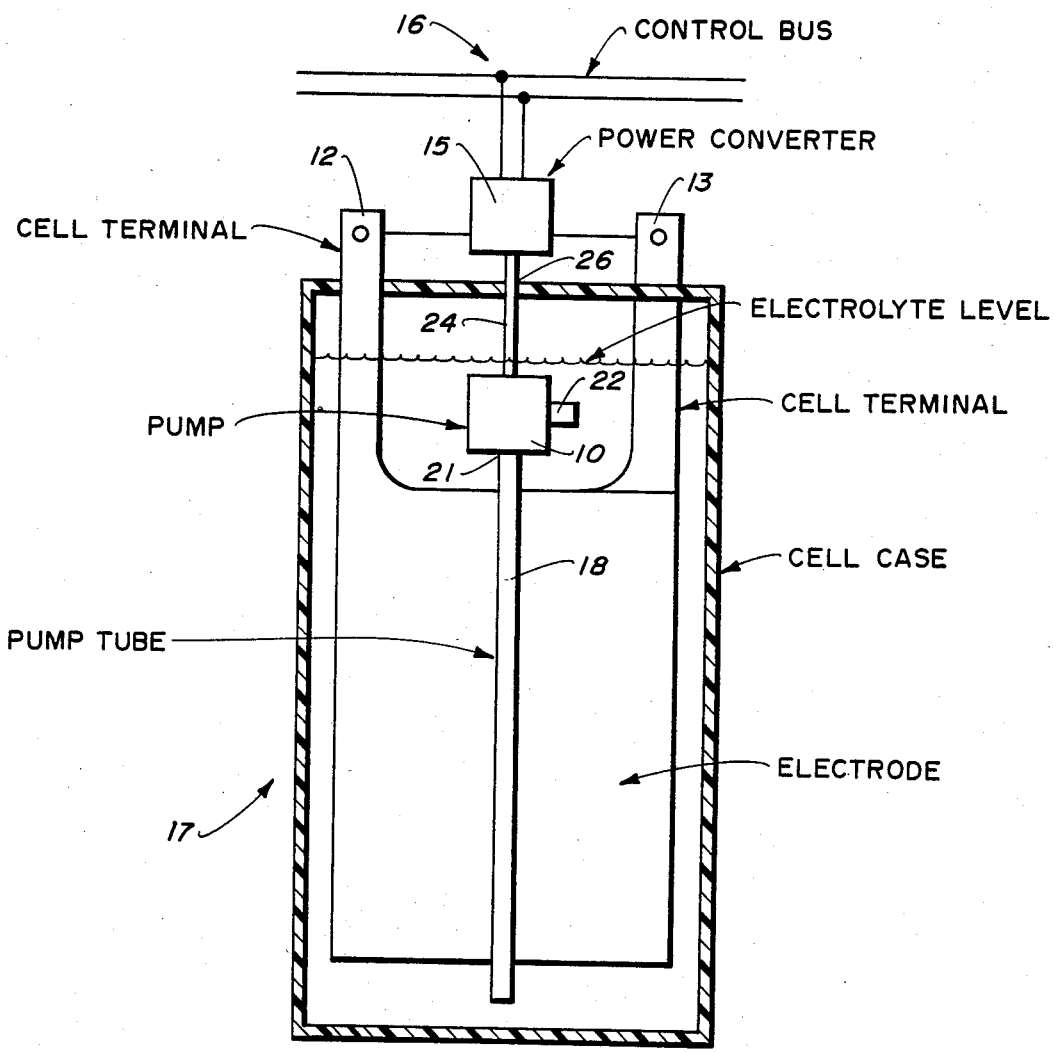
FIG. 2 is a cross-section diagram of a typical acid electrolyte battery all showing a magnetic pump installed.

Mechanically, it is desirable to mount as much of the circulation system as possible external to the cell. FIG. 2 shows a sketch of a cell 17 with the DC-to-AC converter 15 mounted at the top, and with a magnetic pump 10 and a pump tube 18 installed inside. The magnetic pump 10 consists of 7a plurality of coils and magnetic material for pole pieces encapsulated in a plastic case. The case includes electrolyte inlet port 21 for tube 18 and an outlet port 22, and is equipped with insulated electrical leads of sufficient length to reach through a passage 26 in the cell cover to the power converter 15. Tube 18 is shown centrally mounted in FIG. 2; however, it can be located to one side or in a corner of the cell, as desired. In large electrolytic cells, such as in large industrial batteries for example, several pump units may be preferred in each cell to more efficiently eliminate electrolyte sulfation and stratification.

FIGS. 3, 4 and 5 show front side and top views, respectively, of a preferred embodiment of the invention. While only three sets of coils and magnetic core/pole pieces are shown, by way of example, any desired number of coils and magnetic cores can be used. Coils 21, 22 and 23 with their respective cores and pole pieces 25, 26 and 27 are positioned about a flat non-magnetic pump tube 18. The material of pump tube 18 must be of a suitable material for use in said electrolyte and non-corrosive. A flat tube is preferred to provide an acid electrolyte passage for greater magnetic concentration on the electrolyte within the tube between the pole pieces. FIG. 6 shows a circuit diagram of magnetic coils 21, 22 and 23.

In operation, since like charges repel and opposite charges attract, on the first half-cycle or position half of the two-phase AC current through coils 21, 22 and 23, coil 21, for example, will charge electrolyte in tube 18 adjacent the pole pieces of core 25 to a fixed magnetic state (e.g., magnetic +). Coil 22 and coil 23 are similarly charged and electrolyte adjacent the respective pole pieces of cores 22 and 23 will also be magnetically charged negatively and positively, respectively. That is, initially on the first half-cycle the coils 21, 22 and 23 will produce positive, negative, and positive magnetic charges on the electrolyte in tube 18 adjacent the pole pieces of cores 25, 26 and 27, respectively. On the second half or negative half of the first cycle the magnetic fields are reversed, reversing the magnetic charge on any electrolyte in tube 18 adjacent the pole pieces.

On the positive (+) half of the first cycle the magnetically charged (+) electrolyte adjacent the pole pieces of core 25 is immediately attracted to the pole pieces of core 26 which is negative (−) and repelled by the pole pieces of core 25. Also, at the same time the negative (−) charged electrolyte adjacent the pole pieces of core 26 is negatively charged and attracted to the positive (+) charge of the pole pieces of core 27 while simultaneously being repelled away from the negative pole pieces of core 26. When the magnetic domain of the pole pieces is reversed, the sequence is repeated and continued forcing the electrolyte to move in one direction through tube 18.

In FIGS. 7 and 8 are shown a pair of optional lead conductors 35 and 36 positioned at opposite sides of tube 18. The lead strips 35 and 36 are used to reduce the size of the electrolyte passageway 29, which in turn operates to intensify the magnetic field in the restricted passageway area and thus increases the drive on the electrolyte to move it more effectively through tube 18.

The areas labeled "L", "N" and "L90°" represent areas between the pole pieces of cores 25, 26 and 27, respectively, where at any one instant in time the phasing of the magnetic field across the electrolyte passageway in tube 18 is Leading, Neutral, or Lagging 90°, where, for example, at the one instant the electrolyte at area L is charged +, at area N is charged −, and at area L90° is charged +; and at the next instant upon change of phase, the electrolyte at area L is charged −, at area N is charged +, and at area L90° is charged −, with the sequence repeating with each change of phase. The condition of the magnetic field in each area changes as the phasing changes and the phasing of the magnetic field in each of the areas rotates from one condition to the next as discussed earlier.

Preferably the magnetic pump drive area, i.e., the area adjacent the pole pieces, should be resonant to the pump frequency to provide optimum pumping efficiency. One way of doing this is to shape the electrolyte flow tube passageway in the area of the magnetic pump pole pieces (i.e., areas L, N and L90°) to provide resonance to the pump frequency. The lead strips 35 and 36 may be used to shape this area within the electrolyte flow tube passageway 18, or any other suitable means may be used to shape this area.

Obviously many modifications and variations of the present invention are possible in the light of the above teachings. It is therefore to be understood that within the scope of the appended claims, the invention may be practiced otherwise than as specifically described.

What is claimed is:

1. A magnetic system for circulating liquid acid electrolyte in battery cells to prevent electrolyte stratification, comprising:
    a. an electrolyte flow tube made from non-corrodable material forming an electrolyte passageway which extends from the lower portion to the upper portion of a battery cell; the upper end of said flow tube being lower than the electrolyte level in said battery cell;
    b. a magnetic pump means positioned about said electrolyte flow tube;
    c. said magnetic pump means comprising a plurality of adjacent electromagnetic coils and respective magnetic cores with pole pieces located along said electrolyte flow tube; the pole pieces of said magnetic cores being positioned adjacent said flow tube such that a magnetic field generated between said pole pieces by said electromagnetic coils when energized passes directly across the electrolyte passageway within said flow tube;
    d. power means for providing at least two-phase AC current to the plurality of electromagnetic coils along said electrolyte flow tube such that at any one given instant the phasing of the magnetic field generated by one electromagnetic coil is leading while that of the next adjacent electromagnetic coil is neutral and the magnetic field of the following adjacent electromagnetic coil is lagging 90°, with repeating sequence;
    e. the sequentially created magnetic fields operating to sequentially magnetically charge electrolyte within the flow tube between the respective pole pieces to a fixed magnetic state for the given instant, such that change of phase of the AC current causes change of phase in the magnetic fields across the electrolyte flow tube resulting in the sequential attraction of electrolyte in one portion of the flow tube and repulsion of electrolyte in the next adjacent portion of the flow tube to provide a minute pumping action that forces the acid electrolyte to move through said flow tube passageway, thereby preventing stratification of the acid electrolyte.

2. A magnetic acid electrolyte circulating system as in claim 1, wherein said electrolyte flow tube passageway is as thin as possible, while avoiding contaminant clogging, to maximize usable magnetic field for producing greater force on moving electrolyte through the flow tube.

3. A magnetic acid electrolyte circulating system as in claim 2, wherein the narrowest dimension of said electrolyte flow tube is approximately 0.3 mm.

4. A magnetic acid electrolyte circulating system as in claim 1, wherein the intensity of the magnetic field across the passageway of said electrolyte flow tube is approximately 10,000 gauss.

5. A magnetic acid electrolyte circulating system as in claim 1, wherein said power means for providing AC current to operate said plurality of electromagnetic coils includes a DC-to-AC connector connected to battery cell terminals.

6. A magnetic acid electrolyte circulating system as in claim 1, wherein a pair of lead conductors are positioned within said electrolyte flow tube, one each on opposite sides of the passageway therein, adjacent said magnetic core pole pieces; said lead conductors operating to reduce the size of the electrolyte passageway and intensify the magnetic field across the restricted passageway area for increasing the flow drive on the electrolyte by the magnetic fields.

7. A magnetic acid electrolyte circulating system as in claim 1, wherein the passageway within said electrolyte flow tube in the area of said magnetic core pole pieces is shaped to provide resonance to the pump frequency.

8. A magnetic acid electrolyte circulating system as in claim 1, wherein a plurality of electrolyte flow tubes along with respective magnetic pump means are used in various locations in a battery cell.

* * * * *